United States Patent
Cunningham et al.

(10) Patent No.: US 10,066,275 B2
(45) Date of Patent: Sep. 4, 2018

(54) ARC FURNACE SMELTERING SYSTEM AND METHOD

(71) Applicant: Stephen L. Cunningham, Altadena, CA (US)

(72) Inventors: Stephen L. Cunningham, Altadena, CA (US); Martin A. Stuart, Altadena, CA (US)

( * ) Notice: Subject to any disclaimer, the term of this patent is extended or adjusted under 35 U.S.C. 154(b) by 114 days.

(21) Appl. No.: 15/309,495

(22) PCT Filed: May 11, 2015

(86) PCT No.: PCT/US2015/030091
§ 371 (c)(1),
(2) Date: Nov. 8, 2016

(87) PCT Pub. No.: WO2015/172132
PCT Pub. Date: Nov. 12, 2015

(65) Prior Publication Data
US 2017/0183759 A1    Jun. 29, 2017

Related U.S. Application Data

(60) Provisional application No. 61/990,917, filed on May 9, 2014, provisional application No. 62/082,287, filed on Nov. 20, 2014.

(51) Int. Cl.
| | |
|---|---|
| C25B 1/26 | (2006.01) |
| C22B 1/08 | (2006.01) |
| C25C 1/00 | (2006.01) |
| C25C 7/00 | (2006.01) |

(52) U.S. Cl.
CPC .............. *C22B 1/08* (2013.01); *C25B 1/26* (2013.01); *C25C 1/00* (2013.01); *C25C 7/00* (2013.01)

(58) Field of Classification Search
None
See application file for complete search history.

(56) References Cited

U.S. PATENT DOCUMENTS

| | | |
|---|---|---|
| 3,950,486 A | 4/1976 | Cardwell et al. |
| 3,966,633 A | 6/1976 | Friedman |
| 3,979,205 A | 9/1976 | Wanzenberg |
| 3,979,265 A | 9/1976 | Fonseca |
| 4,211,540 A | 7/1980 | Netzer |
| 4,339,546 A | 7/1982 | Randalls |
| 4,426,810 A | 1/1984 | Rudolph et al. |
| 4,631,915 A | 12/1986 | Frewer et al. |
| 4,669,270 A | 6/1987 | Frewer et al. |
| 4,861,446 A | 8/1989 | Blom et al. |
| 5,030,661 A | 7/1991 | Lywood |

(Continued)

FOREIGN PATENT DOCUMENTS

| | | |
|---|---|---|
| AU | 3893285 A | 8/1985 |
| AU | 736577 B2 | 4/1998 |

(Continued)

*Primary Examiner* — Arun S Phasge
(74) *Attorney, Agent, or Firm* — Bodi Law LLC (57) ABSTRACT

An industrial scale smelting system for using arc furnaces for processing large quantities of ore in a production manner for recovery of a plurality of elements in useful quantities using a plurality of electrowinning processes with the options of providing efficient energy recovery and raw material recovery and recirculation capabilities.

13 Claims, 4 Drawing Sheets

(56) References Cited

U.S. PATENT DOCUMENTS

| | | |
|---|---|---|
| 5,437,150 A | 8/1995 | Latham et al. |
| 5,468,354 A | 11/1995 | Zoppi |
| 5,534,131 A | 7/1996 | Zoppi |
| 5,666,800 A | 9/1997 | Sorensen et al. |
| 5,669,216 A | 9/1997 | Ankersmit et al. |
| 5,865,023 A | 2/1999 | Sorsensen et al. |
| 5,896,738 A | 4/1999 | Yang et al. |
| 5,974,002 A | 10/1999 | Tsubata |
| 6,086,744 A | 7/2000 | Zoppi |
| 6,139,059 A | 10/2000 | Metzger |
| 6,159,356 A | 12/2000 | Zoppi |
| 6,203,769 B1 | 3/2001 | Zoppi |
| 6,214,314 B1 | 4/2001 | Abbott |
| 6,223,519 B1 | 5/2001 | Basu et al. |
| 6,233,914 B1 | 5/2001 | Fisher |
| 6,256,994 B1 | 7/2001 | Dillon, IV |
| 6,260,348 B1 | 7/2001 | Sugishita et al. |
| 6,263,659 B1 | 7/2001 | Dillon, IV et al. |
| 6,290,877 B2 | 9/2001 | Naka et al. |
| 6,298,651 B1 | 10/2001 | Iijima |
| 6,338,748 B1 | 1/2002 | Lee et al. |
| 6,430,916 B2 | 8/2002 | Sugishita et al. |
| 6,463,741 B1 | 10/2002 | Frutschi |
| 6,467,273 B1 | 10/2002 | Lott et al. |
| 6,536,205 B2 | 3/2003 | Sugishita et al. |
| 6,919,062 B1 | 7/2005 | Vasileiadis et al. |
| 6,968,700 B2 | 11/2005 | Lott et al. |
| 6,976,362 B2 | 12/2005 | Sheppard et al. |
| 7,101,531 B2 | 9/2006 | Kamijo |
| 7,435,760 B2 | 10/2008 | Herling et al. |
| 7,439,274 B2 | 10/2008 | Steynberg et al. |
| 7,485,767 B2 | 2/2009 | Lattner et al. |
| 7,550,635 B2 | 6/2009 | Tio |
| 7,575,730 B2 | 8/2009 | Steynberg |
| 7,612,118 B2 | 11/2009 | Steynberg |
| 7,670,586 B2 | 3/2010 | Wang et al. |
| 7,772,291 B2 | 8/2010 | Steynberg |
| 7,789,048 B2 | 9/2010 | Coffey, Jr. et al. |
| 7,827,804 B2 | 11/2010 | De Koeijer et al. |
| 7,866,160 B2 | 1/2011 | De Ruyck et al. |
| 7,897,649 B2 | 3/2011 | Norbeck et al. |
| 8,008,359 B2 | 8/2011 | Steynberg et al. |
| 8,038,743 B1 | 10/2011 | Wootton et al. |
| 8,105,403 B2 | 1/2012 | Regnery et al. |
| 8,106,102 B2 | 1/2012 | Steynberg et al. |
| 8,123,827 B2 | 2/2012 | Robinson |
| 8,128,898 B2 | 3/2012 | Van Dyk et al. |
| 8,247,462 B2 | 8/2012 | Boshoff et al. |
| 8,268,026 B2 | 9/2012 | Norbeck et al. |
| 8,297,462 B1 | 10/2012 | Joyce |
| 8,320,023 B2 | 11/2012 | Takahashi et al. |
| 8,349,288 B2 | 1/2013 | Norbeck et al. |
| 8,383,078 B2 | 2/2013 | Wang et al. |
| 8,409,008 B2 | 4/2013 | Asami |
| 8,425,636 B2 | 4/2013 | Bommareddy et al. |
| 8,475,549 B2 | 7/2013 | Vogel et al. |
| 8,552,973 B2 | 10/2013 | Ono |
| 2003/0129110 A1 | 7/2003 | Steynberg |
| 2003/0171442 A1 | 9/2003 | Rytter |
| 2004/0045272 A1 | 3/2004 | Miyoshi et al. |
| 2004/0245086 A1 | 12/2004 | Steynberg et al. |
| 2004/0265651 A1 | 12/2004 | Steinberg |
| 2005/0256212 A1 | 11/2005 | Norbeck et al. |
| 2007/0041883 A1* | 2/2007 | McDevitt ................ C22B 3/22 423/22 |
| 2007/0237691 A1 | 10/2007 | Takata et al. |
| 2007/0256359 A1 | 11/2007 | Wiltowski et al. |
| 2008/0027150 A1 | 1/2008 | Steynberg |
| 2008/0299022 A1 | 12/2008 | Steynberg et al. |
| 2009/0230024 A1 | 9/2009 | Steynberg et al. |
| 2009/0232729 A1 | 9/2009 | Genkin et al. |
| 2010/0003556 A1 | 1/2010 | Hartvigsen et al. |
| 2010/0018116 A1 | 1/2010 | Mahjoob |
| 2010/0137459 A1 | 6/2010 | Stites et al. |
| 2010/0156112 A1 | 6/2010 | Held et al. |
| 2010/0158793 A1 | 6/2010 | Bouillon et al. |
| 2011/0058997 A1 | 3/2011 | Seetharaman et al. |
| 2011/0152593 A1 | 6/2011 | Kelly et al. |
| 2012/0025140 A1 | 2/2012 | Tetzlaff |

FOREIGN PATENT DOCUMENTS

| | | |
|---|---|---|
| AU | 746788 B2 | 7/1999 |
| CA | 2122181 A1 | 11/1994 |
| CA | 2234989 | 10/1998 |
| CA | 2276922 A1 | 1/2000 |
| CH | 69699 A | 7/1915 |
| CH | 271096 A | 10/1950 |
| CN | 1984840 A | 6/2007 |
| DE | 4318168 A1 | 12/1993 |
| DE | 69737623 T2 | 1/2008 |
| EP | 0839919 B1 | 10/1997 |
| EP | D989094 A2 | 9/2000 |
| EP | 1375628 A2 | 1/2004 |
| EP | 2124282 A1 | 11/2009 |
| ES | 2161150 A1 | 11/2001 |
| ES | 2286827 T3 | 12/2007 |
| JP | S59167527 A | 9/1984 |
| JP | H11188262 A | 7/1999 |
| JP | 2002226870 A | 8/2002 |
| JP | 2003027064 A | 1/2003 |
| JP | 2010077260 A | 4/2010 |
| JP | 2010240621 A | 10/2010 |
| JP | 2010280849 A | 12/2010 |
| KR | 20070033026 A | 3/2007 |
| KR | 20070049614 A | 5/2007 |
| KR | 20090045574 A | 5/2009 |
| KR | 20090068427 A | 6/2009 |
| KR | 10-0953859 B1 | 4/2010 |
| KR | 20100127066 A | 12/2010 |
| KR | 101107384 B1 | 1/2012 |
| RU | 2382094 C1 | 2/2010 |
| WO | 2004112447 A2 | 12/2004 |
| WO | 2006084273 | 8/2006 |
| WO | 2008130260 A1 | 10/2008 |
| WO | 2013020042 A1 | 2/2013 |

* cited by examiner

ARC FURNACE SMELTERING SYSTEM AND METHOD

CROSS-REFERENCES TO RELATED APPLICATIONS

This application is the national phase of International Application No. PCT/US2015/030091 filed on May 11, 2015, which claims the benefit of priority to U.S. Provisional Patent Application No. 61/990,917 filed on May 9, 2014, and U.S. Provisional Patent Application No. 62/082,287 filed on Nov. 20, 2014, the entire disclosures of which are incorporated herein by reference.

BACKGROUND

Mining and associated mineral recovery is an important means of obtaining raw materials. There has been an increasing need to improve the recovery process economics while reducing or eliminating the pollution footprint of the industry. To date there is no generally clean "Rock to Resource" pollution free way to recover the entire range of elements or metals in most ores. This is a contributing reason as to why the current field of mineral recovery is messy, polluting and costly.

SUMMARY

Disclosed are a number of examples of industrial scale smelting systems and/or methods using arc furnaces for processing large quantities of ore in a production manner for recovery of a plurality of elements in useful quantities using a plurality of electrowinning processes with the options of providing efficient energy recovery and raw material recovery and recirculation capabilities.

Provided are a plurality of example embodiments, including, but not limited to, a smelting system comprising: a source of at least one feed chemical; a source of ore comprising a plurality of different elements and/or comprising a plurality of different naturally occurring element compounds; at least one furnace for receiving the feed chemical and the ore, wherein the furnace is configured to provide heat for converting the plurality of different elements and/or the plurality of naturally occurring element compounds in the received ore into a corresponding plurality of different chemical compounds based on the feed chemical for output by the furnace; and a plurality of electrowinning subsystems provided in series.

For the above smelting system, the output of the furnace is fed to the plurality of electrowinning subsystems in sequence, such that each one of the electrowinning subsystems operates on a different subset of the different chemical compounds output by the furnace to extract the corresponding elements from the respective subset of chemical compounds thereby releasing the feed chemical or a compound thereof for recirculation in the smelting system. Furthermore, each one of the extracted elements is collected and output by the respective one of the electrowinning subsystems as a product of the smelting system.

Also provided is a smelting system comprising: a source of a feed chemical; a source of ore comprising a plurality of different elements and/or comprising a plurality of different naturally occurring element compounds; at least one furnace for receiving the feed chemical and the ore, wherein the furnace is configured to provide heat for converting the plurality of different elements and/or the plurality of naturally occurring element compounds in the received ore into a corresponding plurality of different chemical compounds based on the feed chemical for output by the furnace; and a plurality of electrowinning subsystems provided in series.

The output of the furnace is then fed to the plurality of electrowinning subsystems in sequence, such that each one of the electrowinning subsystems operates on a different one of the different chemical compounds output by the furnace to extract the corresponding element from the respective chemical compound thereby releasing the feed chemical or a compound thereof for recirculation in the smelting system. Each one of the extracted elements is then collected and output by the respective one of the electrowinning subsystems as a product of the smelting system.

Still further provided is a smelting system comprising: a source of a feed chemical including chlorine; a plurality of different intermixed elements obtained from an ore; at least one furnace for receiving the feed chemical and the plurality of intermixed elements obtained from the ore, wherein the furnace is configured to provide heat for converting the plurality of different elements into a corresponding plurality of different elemental chlorine salts using the feed chemical for output by the furnace; and a plurality of electrowinning subsystems provided in series.

The output of the furnace is fed to the plurality of electrowinning subsystems in sequence, such that each one of the electrowinning subsystems operates on a different one of the element salts output by the furnace to extract the corresponding element from the respective element salt thereby releasing the feed chemical or a compound thereof for recirculation in the smelting system, and each one of the extracted elements is collected and output by the respective one of the electrowinning subsystems as a product of the smelting system.

Also provided is a smelting system comprising: a source of a feed chemical including chlorine; a plurality of different intermixed elements obtained from an ore; at least one furnace for receiving the feed chemical and the plurality of intermixed elements obtained from the ore, wherein the furnace is configured to provide heat for converting the plurality of different elements into a corresponding plurality of different elemental chlorine salts using the feed chemical for output by the furnace; a plurality of electrowinning subsystems provided in series for receiving the output of the furnace in sequence; a chlorinating subsystem including a chloralkyli chloride generator, the chlorinating subsystem configured to recirculate the chlorine from the electrowinning subsystem for reuse in the feed chemical; a flash distillation subsystem for adjusting the pH of the electrowinning subsystem using hydrochloric acid; a water sparging subsystem configured to cool and condense at least a portion of volatized metal chlorides and chlorine output by the at least one furnace for capture and recirculation; and at least one energy capture subsystem configured to operate using a transcritical or supercritical $CO_2$ Rankin cycle for capturing waste energy output by the smelting system for converting to electricity.

The output of the furnace is fed to the plurality of electrowinning subsystems in sequence, such that each one of the electrowinning subsystems operates on a different one of the element salts output by the furnace to extract the corresponding element from the respective element salt thereby releasing the feed chemical or a compound thereof for recirculation in the smelting system. Furthermore, each one of the extracted elements is collected and output by the smelting system.

Also provided is a method of extracting elements from an ore, comprising the steps of:

pulverizing ore containing a plurality of intermixed elements and/or element oxides;
if present, converting at least some of the element oxides in the ore into the underlying elements by stripping oxygen from the element oxides using hydrogen and heat;
heating the elements with a source chemical including chlorine to convert the elements into element chloride salts;
electrowinning the element chloride salts in a manner to remove the chlorine and separate each one of the plurality of the elements from each other for collecting the separated elements into recoverable quantities;
recovering the source chemical for reuse in this method; and
removing the recovered quantities of elements for output.

Further provided is a method of extracting elements from an ore, comprising the steps of:
pulverizing ore containing a plurality of intermixed elements, alloys, and/or element compounds;
if present, converting at least some of the element compounds in the ore into the underlying elements using heat;
heating the elements with a source chemical to convert at least some of the elements into element compounds;
outputting the heated elements and/or element compounds for input into an electrowinning subsystem;
electrowinning the elements and/or element compounds using the electrowinning subsystem in a manner to remove the source chemical and separate each one of the plurality of the elements from each other for collecting the separated elements into recoverable quantities;
recovering the source chemical for reuse in this method; and
removing the recovered quantities of elements for output.

Still further provided are any of the above example smelting systems or methods wherein at least some of the electrowinning processes are configured to extract the respective element(s) by an anhydrous pyrophoric chloride conversion process utilizing heat, and/or wherein at least some of the electrowinning subsystems are configured to extract the respective element(s) using a molten salt process, and/or wherein at least some of the electrowinning subsystems are configured to extract the respective element(s) using an aqueous chloride conversion process utilizing electrolysis.

And further provided are any of the above example smelting systems or methods wherein the plurality of elements includes: Ag, one or more of the Platinum Group Metals, Au, Al, Fe, Co, and Si.

And still further provided are any of the above example smelting systems or methods wherein the plurality of elements includes a plurality of elements taken from the list of: Zn, Cr, Fe, V, Cd, Ni, Co, Mn, Sn, Pb, Cu, Ag, Platinum Group Metals, Au, Al, Ti, Mg, Na, K, Na, Ca, Li, the Lanthanide elements, and the Actinide elements.

And further provided are any of the above example smelting systems or method configured to process ore in quantities of tonnes, tens of tonnes, or even hundreds of tonnes per hour.

Also provided are additional example embodiments, some, but not all of which, are described hereinbelow in more detail.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION OF THE EXAMPLE EMBODIMENTS

Presented are example designs for at least two complimentary recovery processes, namely an aqueous recovery process and an anhydrous recovery process. The disclosed methods and equipment designs can be configured to provide a high degree of mineral recovery of virtually every element from a source of raw ore, in a manner with a significantly reduced power consumption and/or a drastically reduced or eliminated emission footprint as part of the design.

Such a system can be used terrestrially, but another specific area of application, showcasing the design advantage, is to enclose the system in a sealed gas tight vessel and use it in an off planet Earth or extraterrestrial setting, such as in an earth orbit or on another planet, such as to support extraterrestrial mining operations.

The disclosed methods may utilize various additional advancements that can be used in conjunction with each other to accomplish the efficient and clean recovery goals. This can include the use of a transcritical or Supercritical $CO_2$ Rankin Cycle Engine design disclosed in U.S. patent application Ser. No. 13/452,372 (Improved Performance of a) that was filed on Apr. 20, 2012, and is incorporated herein by reference, which discloses the use of an oscillating engine useful for heat recovery, and the material in U.S. patent application Ser. No. 13/074,510 (Oscillating Piston Engine) that was filed on Mar. 29, 2011, also incorporated by reference, and PCI application serial number PCT/US13/36099 filed on Apr. 11, 2013, disclosing an polygonal oscillating engine, also incorporated by reference, that discusses additional engine designs that can be useful for heat recovery purposes as provided herein.

This system also incorporates features of a reformer disclosed in Plasma Arc Furnace and applications, PCT application serial number PCT/US12/49508 filed on Aug. 3, 2012, and incorporated herein by reference.

Additionally disclosed is an improved accelerated Flash Distillation Unit to quickly and efficiently remove water from the produced electrolyte product in a more controlled fashion, whether it is based on an aqueous solution or based on producing hydrates or hexahydrates of chlorides, Ammonium Chloride and metal Ammonium Chlorides, hydroxides, sulphide or sulphate solutions. This unit is used to prepare the solutions for the subsequent electrowinning process. Flash distillation is also used to adjust relevant chemical parameters such as pH and ion concentration in the electrolyte as part of the process to increase recovery of target elements and electrolyte precursor feedstocks.

Figure 1:
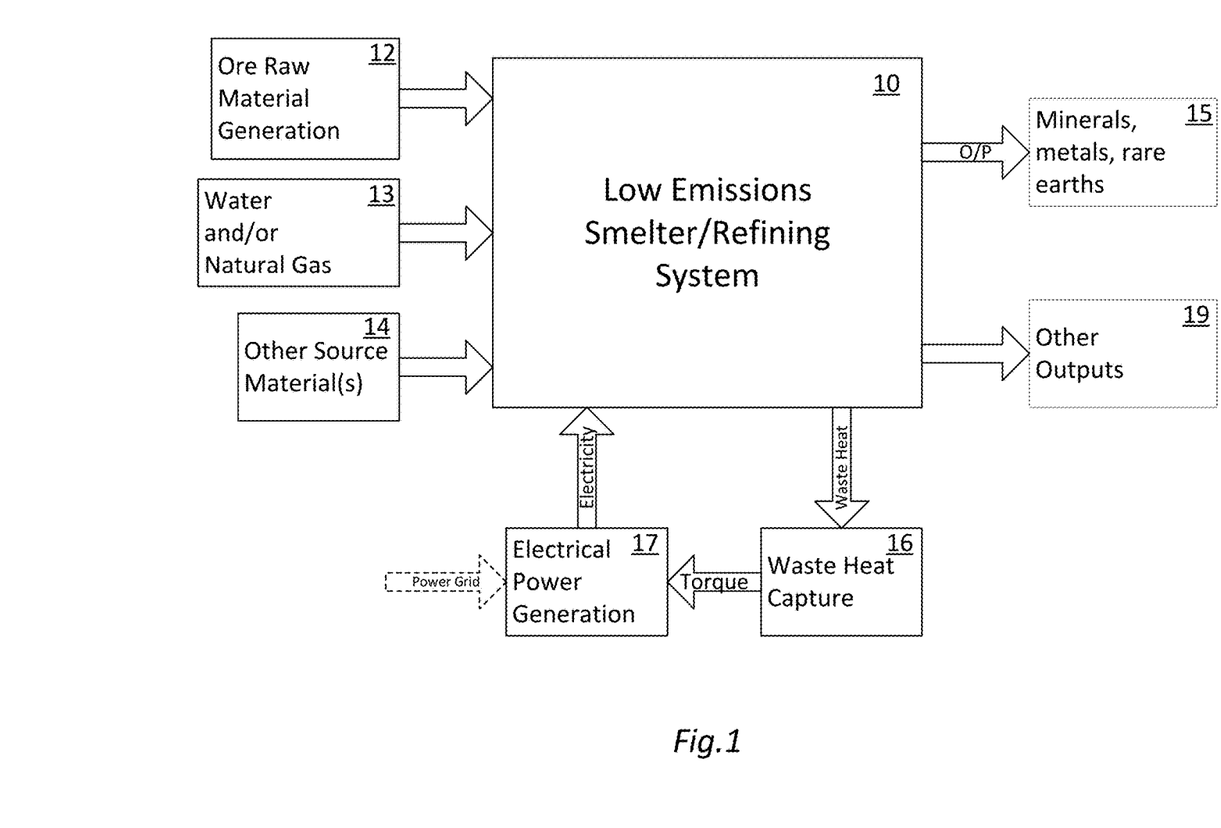
FIG. 1 shows a block diagram of an example smelting system.

FIG. 1 provides a block diagram showing a simple system arrangement. A low emissions smelter/refiner system 10 comprising various components include one or more torches, filters, etc. is provided with raw ore or mining waste materials from a Raw Material Generating subsystem 12, along with water and, if necessary, natural gas 13 as a source of hydrogen. This hydrogen is released by any desirable mechanism, such as the hydrolysis of water. Alternatively, a source of raw hydrogen can be provided. Other source materials 14 are also provided, such as natural gas or electricity to provide power, sources of hydroxides, sulfur, and/or chlorine (e.g., HCl and/or NaCl), may be added to form compounds used to separate the desired elements, etc.

Waste heat is captured 16 such as by using heat exchangers and expanders to drive electrical power generation 17 to feed the smelter/furnace 10. Any excess electricity could be used for other purposes or sold to a power grid, if available, or used to reduce system requirements. Some resulting outputs include desirable minerals, metals, and rare earths 15. Other outputs 19 may include water, oxygen, hydrogen, or other elements or compounds. Very little waste remains. Examples of furnace designs that might be utilized are provided in PCT application PCT/US12/49508 "PLASMA ARC FURNACE AND APPLICATIONS" filed on Aug. 3, 2012, and U.S. Provisional Pat. App. Ser. No. 61/907,459 filed on Nov. 22, 2013, which are incorporated by reference.

Figure 2:
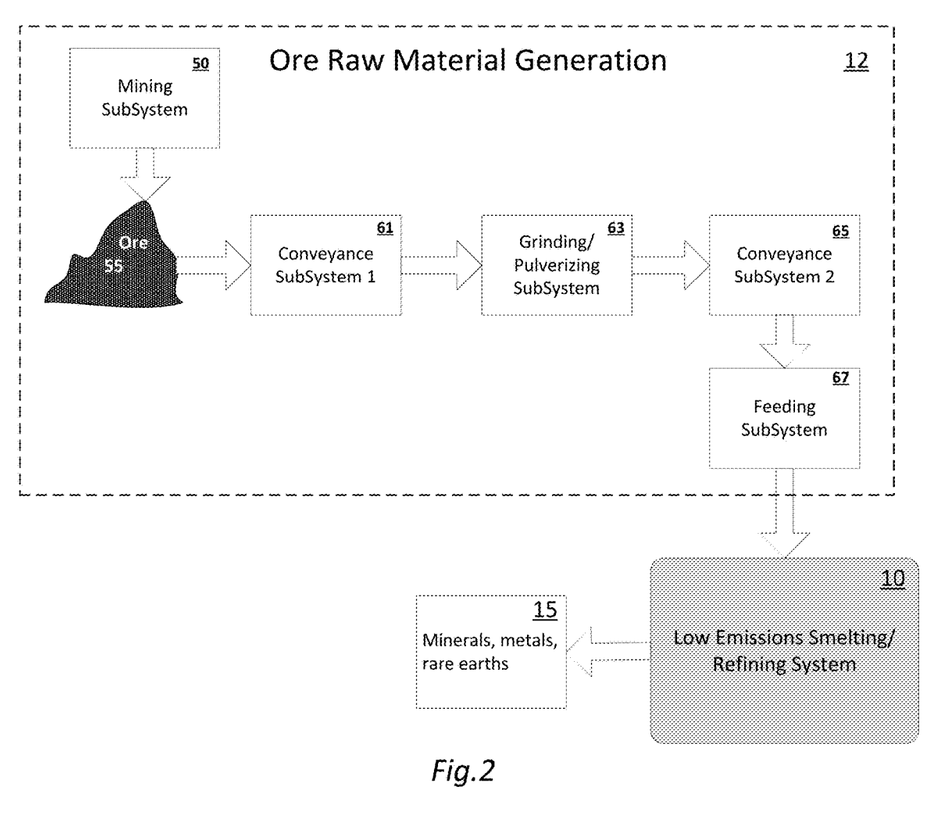
FIG. 2 is a block diagram showing the ore preparation subsystem for the example smelting system of FIG. 1.

FIG. 2 shows a block diagram detailing the Raw Material Generating Subsystem 12 in more detail. A mining subsystem 50 is used to mine the material in a mass production manner, such as by using large mining equipment which may include high-powered laser subsystems, to generate the ore raw materials. Note that in some situations, slag that results from other industrial processes or incomplete refining could be utilized. The ore is transported using a first conveyance subsystem 61 to a grinding/pulverizing subsystem 63 to create feed material for feeding to the smelting/refining system 10, via another conveyance subsystem 65 and a feeding subsystem 67 for controlling the feed into the furnace system 10, resulting in the mass production output 15 of the desired minerals, metals, and/or rare earths.

The raw material generation system 12 is designed to produce and feed the raw materials for processing by the system 10 in large, continuous quantities at the rate of tons, tens of tonnes, hundreds of tonnes, and even into the thousands of tonnes per hour. To ease transportation costs, the system 10 would preferably be located near the source of the ore. The primary limitation on the production rate is the availability of sufficient electricity to support the entire refining process, which can run into the 10 s or even hundreds of megawatt range, depending on the desired throughput.

As a generic example of the process, a furnace vessel is loaded with an oxide ore charge to be processed which is not open to outside air. Plasma temperatures generated by the electric arc raises process hydrogen to as high as 15,000° C. This increases the activity of the plasma and aids in generating a chemical reaction on the surface of the ore charge, which strips the oxygen off the ore from the compounds comprising the ore. The result is that the remaining unbound atom is free to join a greater population of free atoms from the charge mass. The result will be that the makeup of the ore in metals (such as aluminum, iron, cobalt or whatever the ore consisted of, and semi metals such as silicon, will melt to a liquid pool at the bottom of the furnace vessel.

The output gas stream from the furnace can be a mix of hydrogen gas and hydrogen oxide or water vapor. The hot gases will have their temperature adjusted to the acceptance temperature of a molecular filter which is 500° C. Higher temperatures would allow the hydrogen to strip the oxygen from the catalyst which is undesirable.

A Reaction produced Silicon Carbide or Basalt laser Printed Circuit Heat Exchanger (R-SiC PCHX) is where the hot gas stream has the excess heat removed to lower the temperature. This is a heat input device for the Supercritical $CO_2$ Rankin system.

The Molecular filter is a closed to the atmosphere, pressure vessel container holding Iron Oxide or more appropriate catalyst that will react with arsenic, Sulphur or chlorine atoms leaving the furnace. The water can be extracted by condensation and directed to a high Temperature Electrolysis (HTE) unit while the hydrogen gas is directed to the pressure inlet pump for the torch gas manifold.

A high temperature pump is used at this point to compress the process gas stream to system components. A preferred pump is the Polygon Oscillating Piston Pump which is the mechanical reverse of the POPE engine disclosed in PCT application PCT/US2013/36099 and incorporated herein by reference. This usually employs an electric motor to operate the pump.

Further waste heat recovery from the system at this lower temperature point may be desired if condensation is to be employed to separate water from the gas stream, if so this is where a second RSiC PCHX unit inputs heat to the Supercritical $CO_2$ Rankin system. Therefore even at this stage, power recovery takes place with the overall effect of reducing the size of the system.

The hydrogen from the HTE unit adds the newly produced hydrogen process gas at this manifold point and begins the process over again with a new charge at the end of a cycle resulting in a pour off of metal mix into Anode Bars for the next stage.

Transportation can then be provided to a Refinery where it will be electrowinned into pure or semi pure commercial grade market ready products.

Figure 3:
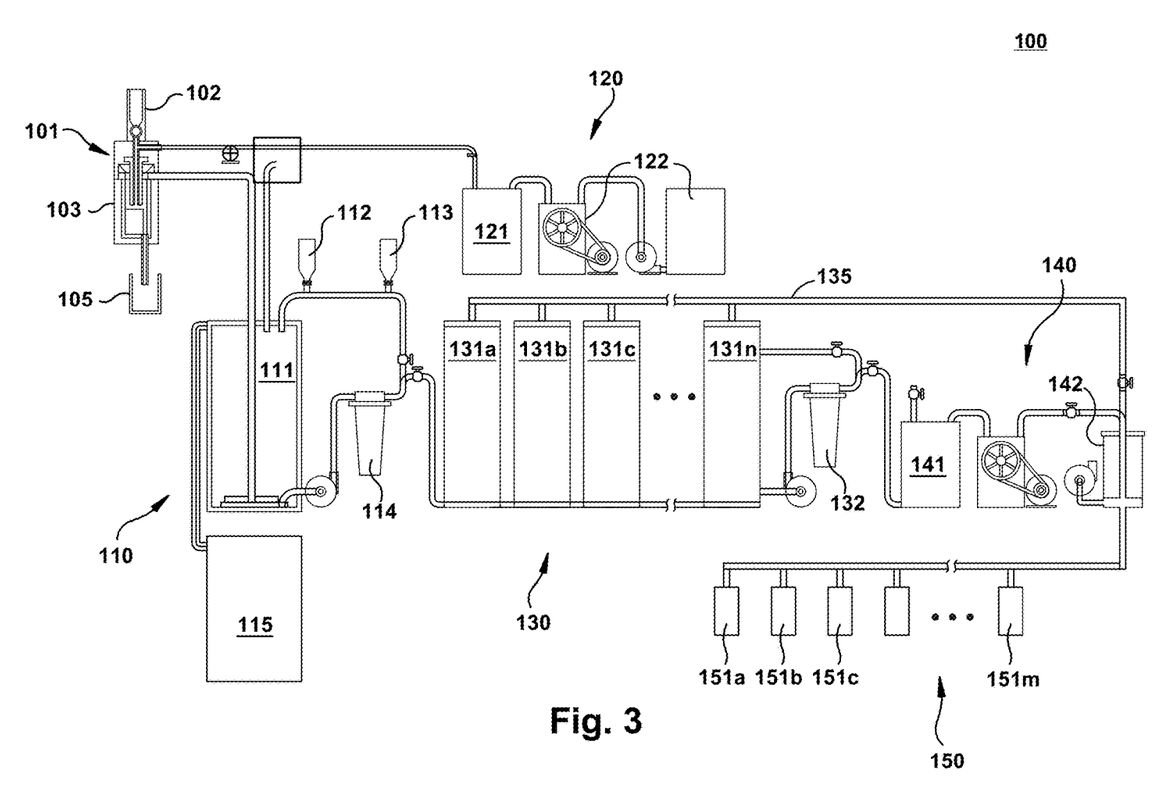
FIG. 3 is a schematic of a first example embodiment of the example smelting system of FIG. 1.

FIG. 3 shows one example smelting/refining system 100 using a single furnace subsystem 100 including a feed hopper 102 for feeding the pulverized ore raw materials into the furnace 103 which acts as an aqueous metal salt or molten salt dissolution tank. A crucible 105 is provided to capture all non-volatized mineral chlorides and molten feed stock. A source of carbon can be provided to the furnace to enhance the removal of the oxygen from the feed stock. The furnace 103 can be configured to use an electrical arc subsystem for heating the input material, and it creates and outputs carbon monoxide and various gaseous metal chlorides of the various elements that are desired to be extracted from the ore.

A water sparging subsystem 110 is provided where the volatized Metal Chlorides are captured and cooled. The subsystem 110 has a metal chloride collection tank 111 for condensing and capturing any volatized metal chlorides and unreacted chlorine product. The sparging subsystem 110 also includes an iron (III) oxide ($Fe_2O_3$) Hopper phosphorus trap 112 and an ammonium chloride addition tank 113 and an iron phosphate filter 114 for filtering the resulting chlorides. The resulting solution is then provided to an aqueous electrowinning subsystem 130. A water cooler 115 is provided to cool the metal chloride solution.

A chlorinating subsystem 120 is provided to generate the desired source of chlorine for feeding the furnace system 100 for supporting the chemical process. This subsystem 120 includes a chloralkyli chloride generator 121 and a water condensation section 122.

The aqueous electrowinning subsystem 130 includes a plurality of electrowinning tanks 131a, 131b . . . 131n, for recovering n different elements from the source ore using an aqueous electrowinning process by using different voltages for the respective electrolysis processes of each tank. An element recovery filter 132 is provided to recover elements that escape the electrowinning tanks. Each electrowinning tank uses cylindrical titanium electrodes where the metals nucleate as nodules on the surface, then are removed by a rotating wiper to fall to the bottom of the tank for removal. This system allows for continuous operation and could be similar to existing art used for uranium recovery in small cells by the Japanese.

A flash distillation subsystem is provided 141 used to concentrate the acid to reduce its pH. This is coupled to an HCl regeneration subsystem 142 for the regeneration of Hydrochloric acid using any excess chlorine gas 135 from the electrowinning tanks. This acid is returned to the chlorine generator 121 for recycling.

Finally, a molten salt electrowinning subsystem 150 is provided with a plurality of molten salt electrowinning tanks 151a, 151b . . . 151m for recovering m different elements from the smelting system. The molten salt electrowinning subsystem uses the molten salt feed stock from the capture crucible 105, and operates at elevated temperatures. The recovered metals descend to the bottom of the tanks and are extracted via a tap consisting of a rotate-able inert ceramic rod with a port as a valve. The recovered product can be cast (cooled) in the form of billets or ingots or nodules.

Note that some embodiments might utilize one or the other of the electrowinning subsystems 130, 150 rather than using them both. Furthermore, n may, or may not, equal m, and the elements recovered by the electrowinning subsystem 150 may be the same, partially the same, or even different than the elements recovered by the electrowinning subsystem 130.

Figure 4:
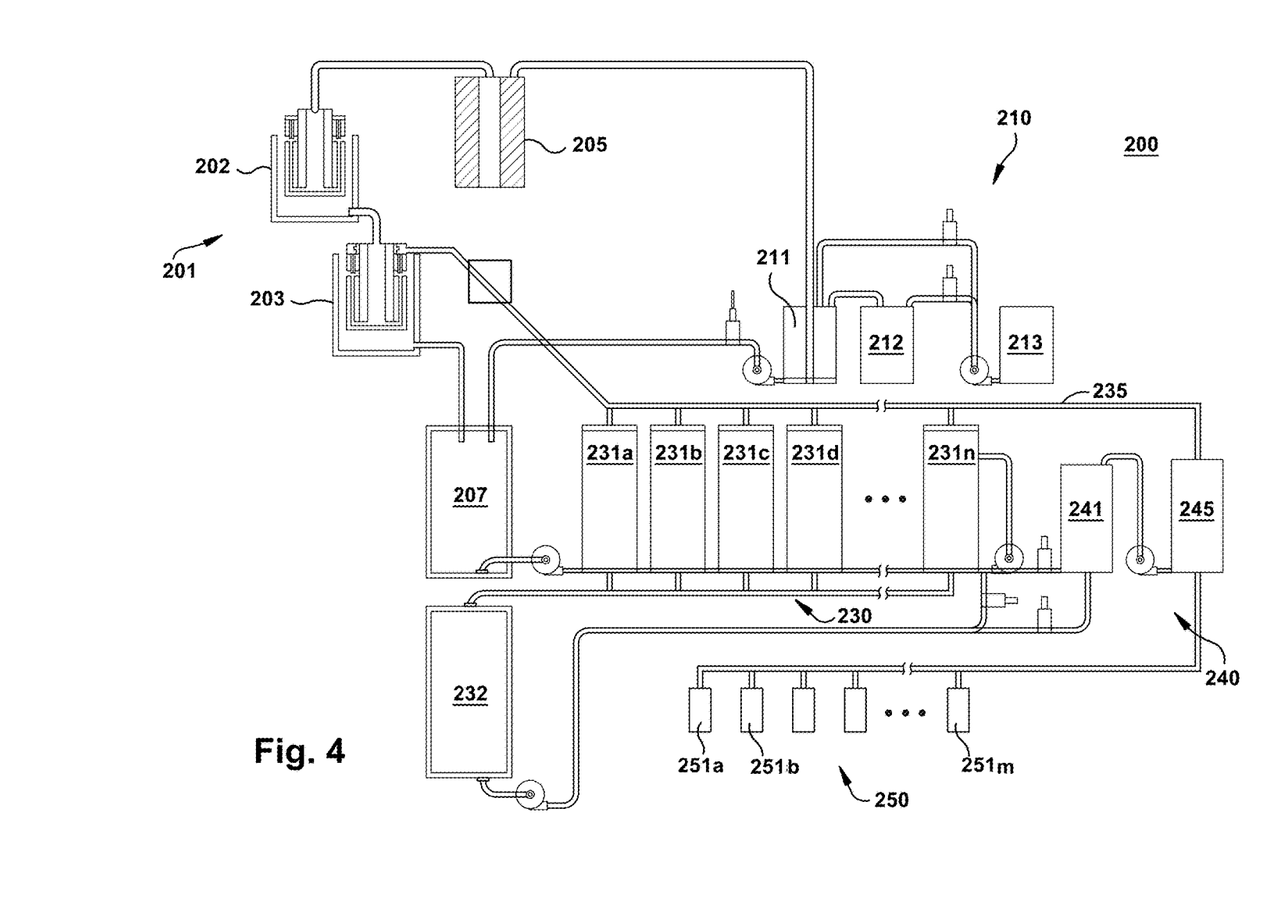
FIG. 4 is a schematic of a second example embodiment of the example smelting system of FIG. 1.

FIG. 4 shows another example smelting/refining system 200 using a dual-furnace subsystem 201 including a first furnace which is a hydrogen furnace 202 which receives the liquefied ore feedstock primarily containing metal oxides along with a source of hydrogen, such as from water. This first furnace is designed to remove a substantial portion of the oxygen from the metal oxides leaving the mixed metals for feeding into a second chloride furnace 203. A calcium oxide and/or calcium carbonate filter 205 is used to filter phosphorus, Sulphur, chlorine, and other byproducts from the exhaust gasses of the hydrogen furnace before feeding a water sparging subsystem 210.

A source of chlorine is provided to the second furnace, which is the chloride furnace 203 for generating the molten chloride salts for outputting to the electrowinning processes via an aqueous metal chloride conversion tank 207, which can also receive metal chlorides that may be recovered by the water sparging subsystem 210. Both furnaces require a source of electricity for generating the arc for providing the heat to drive the furnaces.

The water sparging subsystem 210 is provided with an isolated cooling circuit to cool and condense any volatized metal chlorides and chlorine for capture. The subsystem 210 has a collecting tank 211 for capturing any volatized metal chlorides and unreacted chlorine product. The sparging subsystem 210 also includes an enhanced flash distillation water purification unit 212 and a water storage tank 213. A water cooler may also be provided to cool the metal chlorides.

A hydrochloric acid regenerator 245 and a flash distillation system 241 are provided for water recovery and hydrogen separation. The water condensation section (with a weak HCl electrolysis unit and sparger system) or tank permits the continuous regeneration of concentrated Hydrochloric acid for recycling.

The aqueous electrowinning system 230 includes a plurality of electrowinning tanks 231a, 231b . . . 231n, for recovering n different elements from the source ore using an aqueous electrowinning process, such as by using different voltages for the respective electrolysis processes of each tank. A powder metal product filter 232 is provided to recover various elements.

Finally, similarly to system 100 a molten salt electrowinning subsystem 250 is provided with a plurality of molten salt electrowinning tanks 151a, 151b . . . 151m for recovering m different elements from the smelting system. Again, n may, or may not, equal m, and the elements recovered by the electrowinning subsystem 250 may be the same, partially the same, or even different than the elements recovered by the electrowinning subsystem 230.

Note that some embodiments might utilize one or the other of the electrowinning subsystems 230, 250 rather than using them both.

pH Control Acid to Base in Aqueous Recycling Subsystem

Featured in an example process that may be implemented by one of the above example systems is the judicial use and regeneration of Hydrogen, Nitrogen, Chlorine, Ammonia, Ammonium Chloride, water and methane and or Carbon Monoxide or Carbon Dioxide, in controlled variable concentrations within an aqueous or non-aqueous electrolyte with parameters set for specific recovery of targeted individual elements via the application of electrical power, heat, electromagnetic radiation and vacuum to electrolytes, so as to change the specific range of pH and ratios of these elements and compounds.

Specifically, this first process utilizes a quantity of water as part of the reagent recycling system and as part of the product capture system. This process also uses Chlorine or a metal Chloride gas which is introduced to dissociate a water molecule and form a molecule of HCl (Hydrochloric Acid) and/or additionally form metal chlorides from dissolved materials of the ore. A reagent recycling system first captures Chlorine at a concentration of about 3.26 grams per liter with subsequent electrolysis and combustion so as to produce Hydrogen Chloride gas, the addition of which in a subsequent water filter will, at saturation, produce concentrations of up to 42% with an associated pH of near 0.5 at Standard Temperature and pressure. This represents an extreme Acid end of the controllable pH spectrum and an example of the Chlorine recycling system.

If subsequent to this process an Ammonium molecule is added to hydrochloric acid, there will be an immediate reaction which will produce an ammonium chloride molecule within the solution. As increasing Ammonia is added to the hydrochloric acid solution or gas, the pH changes toward the base end of the pH spectrum. As an example, with a 5% Ammonium Chloride concentration by weight of water, the example solution will result in a pH of between 6 and 7, which is an approximately neutral pH. This represents a transition to a very weak acid from the very strong acid.

Addition of more ammonia molecules will continue the reaction with every free Chlorine atom until there is no free Chlorine in the solution, with the formation of a saturated Ammonium Chloride solution. Ammonium Chloride is a weak acid with a pH of about 6-7 at a concentration of 5% by weight. Its saturation point at standard temperature and pressure is ~744 grams per liter.

At this point the use of accelerated flash distillation would result in a dry reagent product. This is also an example of recycling of this reagent within the system.

When there is no free Chlorine, continued addition of the Ammonia molecule will result in the formation of Ammonium Hydroxide in the aqueous solution, leading to a more basic solution. The extreme of this transition results in a pH of 11.63.

One approach is to use the electrowinning process itself, electrolysis, electromagnetic radiation, heat and vacuum in a closed chamber closed loop based system to control the reverse of this transition.

Reverse pH Control, Base to Acid

If heat is applied to an ammonium hydroxide solution at a strength of about 32%, the solution will boil at about 24.7° C. Additionally, the boiling point is about 34.4° C., at a solution strength of 25%. At 100° C., the ammonium concentration drops to about 5.9%. This illustrates how the concentration can be adjusted with heat.

If vacuum is applied to the solution, Ammonia gas will be more aggressively released than water until the Ammonia will have been removed from the solution. Upon continued applied vacuum, the water will flash distill from the solution until it reaches saturation for the given temperature. Then the water and Ammonia vapors can be sequentially compressed and/or condensed to separate reservoirs containing the liquids for reuse permitting separation. This exemplifies the recycling of these reagents for reuse within the closed loop system.

The reacted Ammonium Chloride will dehydrate under flash distillation, which will result ultimately in the formation of anhydrous Ammonium Chloride residue. If heat is applied, the Ammonium Chloride will decompose at approximately 300° C. into $NH_3$ and $H_2O$ and Hydrogen Chloride Gas. The removal of heat energy via a process heat exchanger with the application of compression will liquefy the HCl (hydrochloric acid) at a temperature of −85.05° C. which is lower than the Ammonia at −33.4° C. If performed with a valved manifold and discrete containers, this separates the Water, Ammonia and Hydrogen Chloride, providing a method of separation for reuse and recirculation.

Anhydrous Chloride Conversion

The above mentioned conversion is the basis for anhydrous chloride conversion of metal oxides as the oxidation potential of $NH_4Cl$ is about twice that of HCl or Cl alone. Thus, if a mixture of metal oxides plus Ammonium Chloride is heated via the described methods at about 190° C., nearly all oxides will be converted to chlorides. In this anhydrous process version, excess reagent is disassociated at 300-350° C. into $NH_3$ and HCl gases which when cooled recombine into reagent $NH_4Cl$ and water. As mentioned, this facilitates recycling of those components.

If metal hydrides and/or salts had been suspended in the solution, the dehydrated or hexahydrated metal chlorides would become the feedstock for molten salt electrowinning or further dehydration using the previously mentioned reagents, such as hydrogen chloride or ammonium chloride, which would be the product. Conversely, if water is applied to this inventory of metal chlorides, most will disassociate from the water solution to various degrees and, specie dependent, into free chlorine and metal ions, for example. The liberation of free chlorine ions in water creates hydrochloric acid. Not all metal ions disassociate in water or to equal degrees, hence there will be a mixture of metal chlorides and/or metal oxychlorides.

For example, in pure water, Sliver Chloride or Rhodium Chloride is virtually insoluble. However, the addition of ammonia via the addition of ammonium chloride permits almost all metal chlorides to readily dissolve. Manipulation of metal ammonium chlorides is the basis for the aqueous based winnowing system described herein.

It should also be considered that the process of electrowinning destroys an ammonia molecule with the ultimate liberation of a nitrogen ion upon the liberation of each metal ion. Hence the process itself is capable of adjusting the ammonium content and pH as needed.

System Applicability Example; Granite and or Basalt Conversion

The chlorination of all elements within a feed stock—particularly basalt or granite, for example, has as its constituents three principal materials: ~50-70% $SiO_2$, ~15% $Al_2O_3$ and ~12% $Fe_2O_3$ as a matrix, with about 10-20% of the total composition being minor metals and enriched elements that are extremely useful and valuable in sufficient quantity, even in extra-terrestrial settings. The anhydrous section of this set of processes permits chlorination of powdered metal oxides, such as by utilizing a radiation accelerated ammonium chloride-chlorination process which also results in water vapor generation with low energy expenditures. The efficient conversion of oxide ores to water vapor and metal chlorides is a key missing technology in extra-terrestrial based mineral recovery systems.

Energy Investment Per Kg of Recovered Material.

The electrical energy invested in carbochlorination is well documented at about 0.4-0.6 kWh/kg ore; however a majority of the conversion energy is derived from potential chemical energy rather than electrical energy. However, energy efficient Carbon sources are problematic in extraterrestrial settings and recycling carbon reactants into reagents is not trivial as conversion temperatures are high.

Accelerated Flash Distillation

Furthermore, with the application of conventional flash distillation, if a vacuum is applied to the aqueous metal salt solution, water will be removed with an energy investment of 0.4-0.6 kWh per gallon. However, if microwave energy is applied to the surface of a water containing solution, and a partial vacuum is applied, then the heated molecules of water will vaporize such that the heat energy from the microwave source will permit more controlled vaporization of a quantity of water from the surface region of the solution. This, as opposed to the conventional flash distillation method in which the dispersed and heated water molecules will volatize en-mass in a sudden transition from the body of liquid in the container. The extra control of this process results in a smaller and more controlled flash distillation process requiring less equipment for control of the explosion-like transition to vapor of the described process. The surface vaporization lends itself to this system operating with the process water spinning in a cylindrical centrifuge container with the total or partial heat input from transitional microwave energy being introduced into the central region of the active area, and the bulk of the heat being introduced via waste heat recovery in other parts of the system if desired. Such a device design lends itself to vertical gravity-based operation or zero-gravity operation in the same or similar design.

Due to the generation, use, and regeneration of heat, chlorine, ammonia, and ammonium chloride, the principal reagent and/or solvent is central to this systems' economics. The energy cost of 1.5-3.6 kWh/kg of chlorine is a predictor of mass conversion performance and economic recovery. Additionally, if hydrogen is the desired product, then the energy investment rises to approximately 18.5 kWh/kg and with real world power losses to about 20 kWh/kg in the part of the system utilizing the low temperature (e.g. 70° C.) $CuCl_2$ catalytic electrolysis system to produce hydrogen.

The hydrogen is then used to recycle the nitrogen in the ammonia section of the system and if desired, to be used for the reducing furnaces.

The latter assumes the chlorine is recycled in a water absorption cell in which weak HCl is created as water absorbs the chlorine at 3.26 g/liter. It is subsequently electrolyzed to produce hydrogen and chlorine in a stoichiometric ratio after which it is reacted to produce HCl gas which will then absorb into water to a concentration of up to 42%. This energy investment is representative of electrolysis of hydrogen chloride or sodium chloride in the chloralkyli electrowinning process. As the reagents of hydrogen and chlorine are recycled and regenerated in a closed loop process, this represents a real energy efficiency of the system. The copper chloride electrolysis section utilizes waste heat within the system for additional energy reduction savings.

The energy investment per kilogram of produced metal product would on average be near 38 kWh/kg. The breakdown would be about 1.67 kWh/kg of Cl, 20 kWh/kg of hydrogen, 2.5 to 3.5 kWh/kg of metal except for aluminum (which would be 9.6 kWh/kg via the $AlCl_3$ process) with the investment of up to 14 kWh to dehydrate this feedstock. Additionally, the rare earth elements could be recovered with a higher investment of electric power in the molten salt electrowinning cells. However, the small quantities of this product would be reflected in the major feedstocks as 80-90% of ore feedstock matrixes are aluminum, iron and silicon. The waste heat of this system can be converted to primary electricity at up to 55% via the $CO_2$ RCE system previously mentioned. This subsystem would reduce the energy investment by up to 50% and as mentioned can be tied into the copper chloride electrolysis for Hydrogen production.

Primary Fraction Element Separation of Converted Chloridized Ores

Silicon tetrachloride will boil from water at 60° C. @ 1 atm—flash distillation will accelerate this process. Titanium tetrachloride will vaporize at 138° C. With the further application of flash distillation, the $AlCl_3$ will become an aluminum chloride hexahydrate, then an aluminum hydroxide, then via additional heat application will convert to $Al_2O_3$ at 300° C. which is insoluble in an HCl solution and can be filtered to a highly purified product. However the recovered $Al_2O_3$ will convert to an anhydrous aluminum chloride in the dry chlorination process detailed elsewhere in this document.

If anhydrous aluminum Chloride is desired from the Aluminum Chloride hexahydrate, then additional ammonium Chloride will need to be added to the mixture and volatized under relatively hard vacuum then heat, first at 190° C., and then to 280° C. to sublime and purify the anhydrous Aluminum Chloride product. At increased temperatures such at 400° C., the excess ammonium chloride is removed from the chloride charge for reuse. In this approach the unreacted ammonium chloride is decomposed to $NH_3$ plus HCl gases, at which point it can be pumped to a reaction and condensing chamber and cooled into the ammonium chloride solid for reuse as a reagent.

The $FeCl_3$ will decompose at 306° C. to $FeCl_2$+Cl. If aqueous ammonia or ammonium chloride is added, for example, to the $FeCl_2$, it can be electrowinned with an investment of about 2.45 kWh/kg. Typical average pure materials are recovered at an average of approximately 3.5 kWh/kg. Therefore, the average energy investment for all processes is approximately 10 kWh/kg.

This, then, is the process to achieve a completely converted chloridized concentrate of ore products. Once the aqueous stage has depleted the targeted recoverable metal ions, the remaining solution is further flash distilled and additionally chloridized to an anhydrous salt which is then processed via Pyro-metallurgical electrowinning or molten salt electrowinning.

Such a process includes the recovery of rare earth or lanthanide series elements, additionally actinide elements and/or transuranium elements can also be recovered via this process. These are recovered in eutectic mixed salts of LiCl, KCl, and CaCl, for example. The typical energy investment is 10-16 kWh/kg for these elements. With the liberation of metal ions there is a molar equivalent release of Chlorine gas, which is recovered by absorption in water to form weak hydrochloric acid, or reacted directly with the aforementioned hydrogen, which is electrolyzed with recovered sodium to form NaCl, NaOCl in the chloralkyli process. This produces hydrogen and chlorine gas in equimolar ratios with the ultimate production of sodium metal in molten salt electrowinning, which is used in titanium and other metal recovery.

INDUSTRIAL APPLICABILITY

The ammonia+hydrochloric acid- or ammoniacal chloride electrolyte will permit the aqueous electrowinning recovery of Zn, Cr, Fe, V, Cd, Ni, Co, Mn, Sn, Pb, Cu, Ag, Platinum Group Metals, Au, and many others. This list is meant to be illustrative, not exclusive, as the number of elements approaches half of the periodic table.

For the Pyroelectrowinning (i.e., molten salts) process operating at higher temperatures, elements such as Al, Ti, Mg, Na, K, Na, Ca, Li, the Lanthanide and Actinide elements are recoverable. In order to control process, crucible, and tank temperatures, this process can utilize the power generation system which employs the polygon oscillating engine and the supercritical $CO_2$ Rankin cycle heat engine, referenced above, to produce low cost electricity and recover waste heat. Alternatively, electrical energy input (resistance heating through crucible plus induction heating), or arc plasma waste heat recovery, or use of microwave and higher frequencies, or other nonconventional heat sources (i.e. concentrated solar or nuclear for extraterrestrial or terrestrial use) can be used to control the tank temperatures.

The application of the Supercritical $CO_2$ Rankin Cycle Engine is to greatly increase the electrical efficiency of the element and metal production system by converting the waste heat from the conversion furnaces and molten salt electrowinning metal recovery crucibles back to room temperature at a high efficiency at nearly every application point in the system.

Illustration of Concept

The terrestrial example process can show economic benefit by using a low operating cost high power output generator, which may utilize one of the oscillating engines referenced herein or concentrated solar or a nuclear reactor, for example. An example design uses a 5 MW Generator to produce electricity and subsequently process gases via the Dow process, or the chloralkyli process to electrolyze HCl gas, or a HCl acid electrolysis system to electrolyze aqueous hydrochloric acid, or a low temperature Copper Chloride electrolysis process to generate hydrogen and chlorine gas with NaOCl or Sodium Hypochlorite.

An advantage of the chloralkyli process is that the sodium hypochlorite can be further electrolyzed into water and metallic sodium. The metallic sodium is useful at converting Titanium and or Zirconium Tetrachloride (and other species) into Titanium or other powder and NaCl for reuse. The first two processes use approximately 26 times less energy (1.67 kWh/kg vs ~39 kWh/kg for the US DOE high Temperature Electrolysis method) to separate these two gases, which are used in equal molar ratios but in separate areas of the process. This alternate example would convert approximately 1,666 kg/hr. of hydrogen and chlorine gas which would be recycled and regenerated in the process. This hydrogen production and use in the molten ore in the Hydrogen plasma arc furnace will permit extraction of approximately nine times as much oxygen from the molten ore which is approximately 40%-50% of the ore's mass.

Additionally when a metal ammonium chloride molecule is electrowinned, an ammonium molecule is disassociated with the resultant release of a nitrogen atom. If the nitrogen atom is reacted with 4 hydrogen atoms catalytically, then an ammonia molecule is created, and if this is subsequently bubbled through any strength aqueous hydrochloric acid or HCl gas, then an ammonium chloride molecule is regenerated. This process is used by the chlorine recycling system.

To illustrate as an example, the average density of granite is 2.65-3 g/cc. Granite contains mixtures of oxides, which have various ratios of Aluminum Oxide, Silicon Oxide, and Iron Oxide. If one removes the oxygen, the overall remaining mass of a typical ore charge is about ½ (~37-60%) the starting mass for most compositions.

To illustrate, the $Al_2O_3$ fraction has a molecular weight of ~102, the aluminum mass is 2 atoms with a Molecular weight of ~54, with oxygen having a molecular mass of 16. The resulting fraction is 52.9% as a metal component vs. an oxide. The density of $Al_2O_3$ is 4.5 g/cc, and the density of Aluminum metal is 2.7 g/cc. Similarly, the molecular weight of Silicon Dioxide is 60, with approximately 28 for Silicon and ~32 for the two oxygen atoms. After oxygen stripping, the semi-metal Silicon is now a 46.6% fraction with a metal density of 3.33 g/cc. The density difference of aluminum vs. $Al_2O_3$ is 60%. The density difference of silicon dioxide at 2.13 g/cc vs. silicon at 3.33 g/cc is ~64%.

Plasma Hydrogen—Oxygen Stripping

The electrolyzed hydrogen gas is used for oxygen stripping with a mixed metal product and the electrolyzed chlorine gas is used for converting the mixed metals into chlorides. The individual gases are fed to a respective arc torch or torches in their respective furnaces. These furnaces would be components of an example system, such as the dual furnace system 200 described above with respect to FIG. 4, in which a closed charge of liquefied and electrically conductive oxide based ore material has been deposited into the central isolated region of the first furnace.

In the first furnace 202, the ionized hydrogen plasma will permit the reaction with and extraction of nine times as much oxygen as mass from the ore (molecular weight of water is 18, with 2H=~2 vs O=~16). This conversion process consumes about 1.67+1.5 or 3 kWh/kg of produced metal. The subsequent and separate chlorine plasma second furnace 203 will convert produced metals (received from first furnace 202) into chlorides for an average energy investment of 3 kWh/kg of metal Chlorides, with a resulting metal content of approximately 50% molecular weight—resulting in an energy investment of ~6 kWh/kg of metals. Therefor the estimated conversion process consumes about 3.5 kWh/kg chlorides. The subsequent electrowinning investment average is approximately 9.5 kWh/kg of recovered metals for all elements.

The First Stage to the Aqueous System

The first furnace vessel is usually provided with an oxide ore charge to be processed (or mixed metals from other sources, such as municipal solid waste) and no part of the process material is exposed to an outside atmosphere during this process. Unique to this furnace design is that the central portion of the furnace is a closed environment permitting any atmosphere to be utilized to react with and transport the volatized composition of minerals or elements liberated at this stage.

The high temperature (1,000° C. to 1,600° C. or higher) of the furnace environment will volatize the elements and their compounds with boiling points under 1600° C. This particularly applies to the innermost section of the furnace crucible, used for adding and liquefying feedstock ores where waste heat from the plasma arc torches is partially recycled. As this is the location where the material is melted and first stage volatilization can take place in an inert gas atmosphere, if desired; for example: $CO_2$ or Argon or a reduced reactivity gas such as Nitrogen can be used.

The heat is generated and recycled in the furnace via heating from the electric power applied to the peripheral crucible, utilizing first the electric resistance of the silicon carbide crucible matrix itself, and also from booster induction coils powered by their respective power supplies and the waste heat from the arc conversion section, which is nearly 50%, on the perimeter. This inner section can use any chosen gas to circulate or transport the volatized elements and transport them to an element specific condensation heat exchanger which is temperature controlled (preferentially, for example, fabricated from silicon carbide) condensation heat exchanger stack. The example transport gas could be argon, carbon dioxide or some other molecular or elemental inert or reactive gas. This choice could add flexibility to create specific reactions by use of a specifically chosen gas as an option. The desired gas or gasses, can be chosen to form a temporary compound with which to increase an element specific transport and purification mechanism and hence recovery. An example of the metal-halogen transport method-concept would be shown in the iodine tungsten halogen cycle and precious metals recovery. In that case, the hot tungsten will form a volatile compound which will deposit metallic Tungsten on a colder anvil. This specific method separates elements of high valence (such as four) and the platinum group metals.

Such an option becomes available as each arc conversion station can be a separate arc and gas circuit from the others and can be isolated. The majority of metal halide compounds are gases at the operational temperature of the author invented plasma arc furnace design.

An alternate example would use hydrogen to bond with Sulphur to make hydrogen disulphide, which is easier to condense and collect.

The disclosed process is similar to the Miller process in which chlorine gas is bubbled through a ceramic lance to the bottom or near bottom of a crucible of molten metal. The chlorine will react with most metals forming chlorides. However the Miller process has been primarily applied to the separation of high noble metal content (~80%) Dore with the usual alloy component being silver. The reaction rate is relatively low with the introduced chlorine gas mass rate typically being 7.7 grams per minute per lance.

An improvement is provided through the use of large area graphite electrode collars surrounding the chlorine lance or orifice. In this system the annular area under the electrode is highly ionized by use of an electric arc which is an accelerator for the desired reactions. While the use of a lance may be beneficial, the electric arc plasma created in the chlorine gas is an accelerating force to the creation of desired conversions.

The plasma temperatures generated by the electric arcs, that are near the vertical tubes outboard of the central feedstock fill port, raise the local process hydrogen or chlorine plasma at the arc attachment point to as high as 15,000° C. This increases the activity of the plasma and accelerates the chemical reaction on the surface of the electrically conductive liquid oxide ore charge. This reaction strips the oxygen from the ore's elements which were originally in the form of oxide compounds. The result is that a water molecule is produced and the remaining unbound atom is free to sink, or float, in the molten ore and join a greater nucleating population of free atoms of metal from the charge mass at the bottom or top collection area of the furnace. The result will be that the materials will segregate with the heavy metals sinking and the light elements rising thereby facilitating collection.

At this point the mixed metal alloy can be tapped and cast into convenient liquid, granules, rods, or bars which will be fed as solid or liquid anodes in the next stage: the chlorine arc furnace. This is where the mixed metals, elements and conductive compounds such as carbides will be converted to chlorides. This step permits convenient separation via fractional distillation or subsequent electrowinning in aqueous or molten salt cells.

The significant difference in the second furnace, the chlorination furnace, for this section near the vertical tubes by the feedstock feed is that an internal manifold exists to conduct the molten metal in the central section to individual atmosphere isolated tubes or columns on the outer section. This feature permits the functional separation of the metal anodes (to be typically chlorinated) and the resulting gas and liquid salts (which are the desired output). Both furnace designs permit separate segregated atmospheric compartments for ore charge and plasma arc conversion stations, as part of the furnace designs.

In the first furnace, the outer section output gas stream from the furnace will be a mix of hydrogen gas and hydrogen oxide (water vapor), which permits water recovery and hydrogen separation. A separate water condensation section or tank permits the regeneration of hydrochloric acid when chlorine gas is bubbled through it after the chlorine is liberated in the electrolysis cells of the electrowinning recovery section(s). Consequently, the hydrogen and chlorine are recycled indefinitely in a closed loop in this process.

Typical source ore may contain quantities of minor elemental composition such as Sulphur, phosphorus, halides, rare earths, and trace elements. In smaller versions of this system, a molecular filter is an option to capture these elements as they may otherwise constitute the majority of problem pollutants. Alternate designs employ iron oxide which is fed into a water sparger tank where the volatized metal chlorides have been captured and cooled. This will permit the conversion of the above mentioned elements into iron compounds (principally iron phosphate) as a precipitate, and permit separation from the aqueous solution.

In a parallel industry application, the petrochemical industry uses ceramic bead carriers for iron oxide as a molecular filter which operates at about 500° C. These beads can be regenerated when saturated with pollutants via re-rusting the iron oxide and removing the contaminants in an aqueous solution, followed by concentration via dehydration methods.

For larger system designs, a fractional distillation device could use, for example, a supercritical carbon dioxide Rankin cycle engine as referenced above, which is preferentially used to establish the appropriate condensation temperatures. These design elements might utilize monolithic silicon carbide or powdered silicon Carbide and/or basalt printed circuit heat exchangers as heat transfer devices.

A variation of this process uses a carbo-chloro-thermal process for rare earth mineral recovery (see Brugger and Greinacher 1967) and the ammoniacal chloride solutions discussed in U.S. Pat. No. 5,468,354, incorporated herein by reference. Further use can be made of temperature controlled distillation heat exchangers to condense volatized metal chloride gases.

Such an approach may not be completely closed loop, but it would generate useful amounts of carbon monoxide which is one of the precursor gases to balanced syngas generation in a reformer to manufacture methanol. This becomes a potential design option for a combined mineral/metal recovery system component to the reformer disclosed above (PCT application serial number PCT/US12/49508 filed on Aug. 3, 2012) that can be used, for example, for municipal solid waste recovery systems.

To increase the energy efficiency of the system, the hot gas streams would have excess heat removed to lower the temperature. This heat would be an input to a Supercritical $CO_2$ RCE to lower the energy investment of the system by recovering approximately 50% of waste heat energy and converting it into primary electrical power to feed back into the system. The balance of the waste heat can be used in the (relatively) low temperature HCl $CuCl_2$ hydrogen generation system.

The Molecular filter, when used for terrestrial systems, could be used instead of the SiC PCHX fractional distillation unit (which makes the system closed loop). The filter is provided as a pressure vessel container, closed to the atmosphere, and holds iron oxide or a more appropriate catalyst that will react with arsenic, Sulphur, phosphorus or chlorine atoms output by the furnace. The water can be extracted by condensation and directed to the regeneration unit while the hydrogen gas is directed to the pressure inlet pump for the torch gas manifold. This represents a compromised version of the preferred design. The regeneration solution would be concentrated and become a separate feedstock to the tailored phosphorus and Sulphur recovery section. This would still constitute closed loop recovery as the system could capture and convert these compounds to pure elemental states via electrolysis.

It should be noted again that cold plate heat exchangers can be incorporated in the place of the molecular filter to recover specific elements by fractional distillation. The molecular filter is for convenience, as these particular elements and the compounds they are transported in may not have sufficient recovery value at existing concentrations. Thus it is an option to concentrate those elements for a specific designer choice version of this system.

A high temperature compressor pump is used at this point to compress the process gas stream to system components. The preferred pump is the Polygon Oscillating Piston Engine acting as a pump, which is the mechanical reverse of the engine. This usually employs an electric motor to operate and would preferably be constructed of high temperature inert materials such as silicon carbide or other ceramics.

There may be a need to further recover waste heat from the system at this lower temperature point if condensation is to be employed to separate water from the gas stream. If so, this is where a second RSiC PCHX unit inputs heat to the $CO_2$ RCE.

The $CO_2$ RCE can be utilized in a multiple condensation stage feature enabling subcomponent, that has an advantage again as water begins to condense at any temperature up to 1660° C. The $CO_2$ RCE stops converting heat to power at 82° C. Therefore, even at this stage, power recovery takes place with the effect of reducing the size of the overall system and improving energy efficiency. The compressor would be utilized as a $CO_2$ heat pump to derive low temperature condensation as $CO_2$ heat pumps have a high coefficient of performance in operation. This feature would utilize the RSiC PCHX heat exchangers and polygon oscillating piston pump.

The hydrogen from the Dow or HCl gas electrolysis unit adds to the newly produced hydrogen process gas at this manifold point and begins the process over again with a new charge at the end of a cycle resulting in a pour off of metal mix into anode bars or granules for the next stage electrowinning either in aqueous or molten salt systems.

Ore transportation to the included Refinery section is accomplished by use of a hybrid truck or conveyor system, used to carry the metal or metal compounds to the plant where it will be electrowinned into pure commercial grade market ready products.

Producing Chlorides (Halides)

In this process, the liquid metal is preferentially fed into the segregated arc region of the second furnace similar to the first, for chlorination via the Plasma arc torches which are similar to the first example furnace design. With the exception that the metal feed is constrained to just the core tube central portion and filler arc feed tubes. The adjacent area is isolated from the liquid metal. This permits the molten chloride (halide) salts, as gases or liquids, to be collected or tapped and directed into the aqueous dissolution and sparger water filtration system. A second such sparger air/water collection system functions to capture volatized chlorides and other elements in the furnace off gases. Here, the gas products are thus captured and dissolved chlorides can be subsequently pumped to the electrowinning system for pure element recovery. Non aqueous soluble chlorides are captured via filtration and processed as ammoniacal solutions as mentioned elsewhere.

The second furnace has chlorine (halide) gas fed across the arc region where the electric power from the arc drives and accelerates the production of chlorides (halides) of the metals in the melt pool at each torch arc location, and alternately the metal can be fed into the arc as a bar for smaller discrete versions of the process. However for convenience to the designer, the solid bars may be easier to process in smaller systems. In operation, the mixed metal product from the oxide stripping furnace is fed into the central bore of the second furnace. In operation it is identical to the first furnace with the difference being that the first furnace removes oxygen from the ore charge and produces a mixed metal Dore' bullion. This Dore' bullion is fed into the receiving central bore of the second furnace. At the arc locations, which are located peripherally around the central liquid metal feedstock reservoir and can be any size to accommodate any conversion rate, the metal is converted into metal chlorides (halides) at the same basic rate that the ore removes oxides in the first furnace.

In contrast to the above aqueous system, for anhydrous chloride conversion a multiple molar ratio of ammonium chloride is mixed with metal oxide powder and conveyor belt fed to be heated using a multiple frequency microwave radiation or induction heated oven.

Combined Molecular Filter Water Sparger for Pollution Control and Mineral Recovery.

This sparger (item 207) dissolves the solid metal chloride salts and also captures the volatized metal chloride salts including phosphorus tri-chloride and Sulphur dichloride.

In the chlorination furnace, the molten salts that have boiling points above 1200° C., will be liquids which will be recovered at a tap point in the perimeter area of the chlorination furnace. They are first captured in a water filled receptacle tank 111 adjacent to the chloridizing furnace. The gas phase salts leave the furnace as volatized vapors. These gases are ducted to the companion capture tank 115 as an actively cooled sparge tank in which the gases are bubbled through this second tank. Alternatively, direct condensation could be used.

Phosphorus and Sulphur Species Control

The phosphorus based compounds are volatile gases chiefly consisting of $POCl$, $PCl_3$, and $PH_3$. When sparged through water all of them react to form phosphorus and phosphoric acid. These compounds will react with applied Iron Oxide ($Fe_2O_3$) to form iron phosphate, which is insoluble in water and will precipitate out in a settling tank section or preferentially be captured in a filter. Iron oxide will also react with and convert the Sulphur hydride and Sulphur dichloride.

As an alternate design choice, this second tank can be replaced with an active fractional distillation heat exchanger, with which to capture the volatized gas phase salts. This is the preferred design as it is the most element and energy efficient method.

Electrowinning and Pyro Electro Winning.

Electrowinning of the mixed metal Dore' bars can be performed using current industry methods. Alternately, the mixed metal Dore' Bullion can be cast into anodes and immersed in a bath of dilute HCl acid or pure HCl gas, ammonium chloride or NaCl or any number of high chlorine content solutions, such as ammonium chloride. The mentioned exemplary compounds are common but not exclusive to this process. This example permits illustration of Pyro Electrowinning in pure molten salt or aqueous HCl or metallic ammonium chlorides or HCl with added ammonium for pH control. The cathode is made of a chemically inert material such as carbon graphite or low voltage drop coatings such as platinum or platinized catalyst coated or impregnated titanium or inert refractory compound material (by example titanium diboride).

The electrowinning tanks 131 and 231 would be closed to the atmosphere as chlorine gas would be liberated in the process. The gases would be removed by a similar version of the previously mentioned molecular filter or preferably ducted to be reacted with hydrogen from the example electrolysis unit to manufacture HCl (hydrochloric acid) and recycle this resource as it is a principal electrolyte. This is where the recovered water is used to capture the chlorine gas as the gas bubbled through the water produces, through a two-step low concentration electrolysis of H and Cl which is subsequently reacted as a gas to process into a saturated HCl acid solution with saturation being as high as 42%.

Water, Chlorine, and Hydrogen Gas Recovery and Recycling.

Hydrogen gas is reacted to produce water in the first furnace at the arc, after which water is condensed and converted into weak hydrochloric acid (3.26 grams per liter) where the chlorine gas is captured via sparging. Then via electrolysis of the HCl into hydrogen and chlorine gas, HCl gas is created by reacted in a torch or UV oven and/or $Fe_2O_3$ magnetite chemical catalyst reactor. At this point it is hydrogen chloride gas which will absorb into water to much higher concentrations of up to 42%. Alternately, the hydrogen can be reacted with chlorine gas directly after which it can be directed to the Dow Electrolysis unit for separation to pure process gases. However, the regeneration of HCl to make and reuse as a source for chlorine gas is one of two central reagent recycling systems that work together.

The excess chlorination of water (i.e., more than 3.26 grams per liter or 0.0894 moles of $Cl_2$ per liter) will result in liberated chlorine gas from the solution as gas is fed into the chlorine manifold of the hydrogen chloride electrolysis unit to produce the process hydrogen and chlorine gas and constitutes a portion of the closed loop.

In the aqueous system, hydrogen and chlorine gas (or halide gasses) are used in separate or segregated electric arc plasma processes within the same system, and these gases are endlessly recycled to achieve a pollution and emission free recovery process and system.

This provides a unique application which is to process oxide ores directly from the source, whether it is from mines or metal mixes such as from municipal solid waste recovery as illustrated in the referenced reformer system, or metal mattes from slags as in the primary smelting industry. This can also be used to process environmental toxic waste sites such as the red mud ponds that are waste byproducts from aluminum recovery plants and the coal fly ash from power plants and even radioactive contamination sites.

Rare Earth Recovery; Electrowinning Recovery

Another version design uses metal chloride feedstocks directly to recover all elements whether using ammoniacal chloride aqueous or molten salt electrowinning cells. The deviation from the previous described electrolyte recovery methods is early stage fractional distillation under partial vacuum of two metal chloride compounds. The elements recovered at this stage are silicon tetrachloride, as it vaporizes at approximately 60 degrees ° C., and titanium tetrachloride which vaporizes at 138 degrees ° C. after the water is flash distilled from the capture solution.

There is a problem with many metal chlorides when they are captured in water, in that they form oxychlorides as they become dehydrated. The difficulty is that they do not necessarily convert to pure metal chlorides upon heating to drive off the water when dehydration is desired. An example is aluminum chloride, which forms aluminum chloride hexahydrate and upon heating will first form aluminum oxychloride which will then convert to aluminum hydroxide then aluminum oxide rather than revert to aluminum chloride when heated.

In processing Rare Earth oxides, mixing 2 to 4 times the molar ratio of metal content with ammonium chloride will completely convert the feedstocks into chlorides (i.e. $MeCl_2$, $MeCl_3$ or $Me_2Cl_6$) via dry ammonium chloride powder and do so with a rather low heat of 190° C.

Feedstock can be forced to revert to the chloride by mixing the feedstocks with twice as much, or a two to four time molar concentration of, ammonium chloride to the metal and then ramp the heat of the feedstocks to 400° C. under a high vacuum. This is where the system now utilizes the second reagent called ammonium chloride. This is made and regenerated when Ammonium-$NH_3$, is allowed to mix with hydrogen chloride gas-HCl. It then spontaneously forms ammonium chloride-$NH_4Cl$. This precipitates to form a solid which is subsequently ground into powder for convenient reuse. When heated, the ammonium chloride sublimes as it decomposes into the two precursor gases, which upon cooling recombine to ammonium chloride. The cooling can continue to the formation of a solid at which point this reagent is available as a feedstock material to start the process again.

When the aqueous ammonium metal chlorides are electrowinned, nitrogen is released and captured, after which it is mixed and reacted under a catalyst to form ammonium gas —$NH_3$ which can be stored as a compressed and refrigerated liquid or as ammonium hydroxide when the ammonium is mixed with water. The ammonium will be liberated upon heating from the water. Both methods have their advantages. In a space setting the ammonia liquid can be stored under a low pressure tank for reuse. In this state it can be a direct replacement for water as a coolant and reaction mass for use in a Variable Amplitude Specific Impulse Magneto hydrodynamic Plasma Rocket or VASIMR Rocket as described by Astronaut Franklin Chang Diaz.

For the achievement of purer product materials, other processes can be used such as fractional distillation or zone refining. In this version the bath is operated at elevated molten salt temperatures and would employ the $CO_2$ RCE to control temperatures, and electrical heating sources such as waste heat from the electrolysis process itself with induction heating or E beam heating to facilitate the above mentioned techniques.

Metal Recovery Electrowinning

Electrowinning is an element specific recovery process via largest practical area electrodes, electroplating onto a target cathode, either in aqueous or molten salt versions. The primary advantage to molten salt version is the size of the system is typically 100 times smaller for the same amount of recovered product. This process permits a mixed metal cation to deposit out of the mix of metal species by applying the lowest voltage metal plating potential at a time until that specific element is depleted from the solution.

A separate Electrowinning tank or crucible can be provided for each specific type of element recovery. One example is using Hafnium Tantalum Carbide crucibles (existing choices also exist) that are vacuum PLD formed onto molds to create pure Hafnium Tantalum Carbide crucibles or Silicon Carbide coated Crucibles for this purpose. Both of these designs could incorporate internal cooling channels for flowing carbon dioxide gas based temperature control.

The most convenient type of solution to work with is Ammoniacal Metal Chlorides as first nitrogen gas is liberated for recycling to ammonia feedstock gas to make ammonium hydroxide. Later in the system chlorine can be liberated and become gaseous above the tank or crucible (as in the aqueous or molten salt recovery version) or liquefied at 108 psi and stored in tanks constructed for this purpose. This permits a ducting network to reclaim the gas and convert it back to a usable resource such as Chlorine, Hydrogen Chloride gas or Hydrochloric acid in a closed loop.

Pyrophoric Electrowinning

This version is based on high temperature water free (anhydrous) baths of various ratio mostly molten eutectic Potassium chloride, Calcium Lithium Chloride, Magnesium Chloride and Sodium Chloride salts, chlorides, oxychlorides, Hydroxides or Sulphates/Sulphides and is referred to as the method that would be employed when the non-aqueous methods cannot be used or the pyrophoric process is otherwise preferable.

An example: base ore transportation costs for extraction at the time of this reference are about $10/ton. The plasma reduction process should cost about $145+$58.21 in Natural gas. The Electrowinning process uses generally about 2.5-3.5 kWh per kg of metal in the electrowinning tank section. If a short ton is 909.09 Kg, then this would be about 454.54 kg of mixed metal which would use 3 kWh/kg (to plate to metal)=1363.635 kWh. This is $38.42 at $5/1000 cubic feet of natural gas (Current Wholesale). Costs to process and refine a ton of dirt is $10+$145+$58.21+$38.42=$251.63 (of which $203 is natural gas-so a photofission reactor would cut the cost to about ¼). This scales with a modular furnace to about a 20 tones per unit per hour reformer system.

A review of the recoverable resources in Basalt or Granite like deposits indicates that with the aluminum, Iron, Cobalt and silicon these specific resources would yield approximately $1,100 per short ton at current market prices, without any special elements such as refractory, Rare Earths, Gold or Platinum Group Metals. This sample partition is 25% Silicon at $1.25/kg ($141.88), 8.375% Aluminum @ $2/kg ($76.045), 8.68% Iron at $0.088/kg ($6.94), 6.15% Cobalt @ $28/kg ($781.79)=$1,006.66. This figure is per short ton of feedstock. This example unit should process 0.563 tons for this amount in an hour, so yield would be $2,381/hr. with a cost of ~$270.

This example is based on standard basalt rock comparative samples from the USGS, used as a control in an XRF assay and expected Granite compositions.

The resulting process cost reduction numbers are tantalizing. The flash distillation unit shrinks the wet side size perhaps by 1000 times, the furnace shrinks the process side by an order of magnitude, and by virtue of not needing a crusher then conveyor equipment for that unit (or a floatation tank) the size is also reduced by a similar amount.

An alternate chloridizing method for recovering commodity metals shows they can be converted in ammonium chloride powder with metal oxides or common ores, which can be later electrolyzed or in hydrochloric acid to make aqueous Chlorides. The gaseous Chlorine released in the electrowinning stage is recovered and subsequently reacted with the recycled Hydrogen again and reused as HCl in the gas recovery stage of the exemplified Dow Electrolysis unit and subsequent electrowinning unit for element recovery (see below). Alternatively the Nitrogen and Hydrogen can be reacted to form Ammonia which is subsequently reacted with Chlorine to form Ammonium Chloride for use in the dry chloridizing, low temperature process.

HCl regeneration is accomplished via water absorption, electrolysis followed by a catalytic and or thermal conversion, with a subsequent absorption in water in a suitably built misting tower. This set up permits 42% HCl concentrations. An alternate use is to react the HCl with $NH_3$— also regenerated—to make solid Ammonium Chloride (which is a direct feedstock). This system is better suited to space applications as water is heavy and necessary for life, so by eliminating its need for the operation of mineral recovery in that environment, it is more desirable. Additionally the anhydrous system produces water as a byproduct vapor during the conversion reaction using the oxygen formerly attached to the metal oxides of the ore itself.

In a first stage sprayed water capture cell, Chlorine gas is absorbed at a rate of 3.26 grams per liter. This is sent through an electrolysis cell which produces Hydrogen and Chlorine gas. Subsequently this stoichiometric gas mix is catalytically and/or thermally reacted to produce Hydrogen Chloride gas, which can be sent through a second water spray unit where the HCl gas is absorbed or compressed to liquefy the Chlorine from the Hydrogen. This form of separation is possible with heat removal and contained silicon carbide foam as a safety assist via reduced combustion probability, which also aids in waste heat recovery. This unit will produce concentrated HCl acid or pure Chlorine liquid and compressed Hydrogen gas. The non-terrestrial version of this system can utilize this unit for the combined capture and concentration of Chlorine, Ammonia and HCl acid reagent if so desired by the designer.

Reagent Recycling

Since this system design specifically utilizes closed loop reagents, the aqueous portion converts single element or mixed metal feedstocks into an solution which would be used to electrolyze (electrowin) into pure metal products. This electrolyte is initially Metal Chlorides which is converted by introducing ammonia gas, into an Ammonium Chloride-Metal or Ammoniacal Metal Chloride mixture (meaning many Ammonium Metal Chlorides). When the metal chlorides are electrowinned the Chlorine gas is released which is captured by a water mist tower, this produces weak Hydrochloric acid. This weak HCl acid is electrolyzed into Hydrogen and Chlorine gas which can be used directly in the arc furnaces or sent through a reaction furnace or cell to produce Hydrogen Chloride gas, this gas when introduced into water as in the misting towers, will produce concentrated 42% Hydrochloric acid. Elsewhere in the system, Ammonia is regenerated from the recovered Nitrogen gas in the Ammoniacal Metal Chloride aqueous water based electrowinning section. The Hydrogen is produced as the sole product from a Hydrochloric acid or low temperature (33° C. to 100° C.) Copper Chloride and/or Zinc Chloride electrolyzing unit. This assumes the Chlorine gas is recaptured in water and recycled as concentrated Hydrochloric acid.

This part of the system uses the weak hydrochloric acid (i.e. 0.089 Mole) as feedstock. The Hydrogen is reacted with Nitrogen in an ultraviolet activated iron oxide (magnetite) catalytic oven to produce the ammonia $NH_3$, which is then mixed with hydrogen chloride gas to make ammonium chloride which is used for dehydration and or rechloridizing section of previously hydrated metal chlorides. The drying process utilizes a two to four time molar ratio of excess ammonium chloride in a heated (190° then 350-400° C.) vacuum oven.

The Molecular filter, if utilized in the first stage furnace or rock melting furnace, is regenerated by filling the cooled filter tank with water to re-rust the iron oxide catalyst pellets and transfer the Arsenic, Phosphorus, Sulphur and chlorine products to the water, then in turn to a dehydration or flash distillation tank to turn the mentioned compound products into a solid for further processing. The water is recycled after condensation.

By directly processing Monazite, the system can be configured to recover the phosphates as trisodium phosphate (TSP) in this process.

In the above process where HCl is introduced, an alternate method is to the mix the Oxides with a 4× Molar mass of anhydrous Ammonium Chloride, then heat the mix under high vacuum and with a low dielectric absorption line microwave to simultaneously dehydrate and chloridize the oxide feedstocks. This changes the flow chart example to bypass step 1 and 2 and derive a more advantageous anhydrous chloride product that can be fractionally distilled or electrowinned directly or both, such as in a manner that is currently known, for example.

The improvement in the recovery process of the above systems is to process via a closed loop melt and reduction of the predominantly oxide ore in a hydrogen arc plasma furnace. The gaseous product of which is directed through one or more of the following in order to be closed loop and not polluting.

This is followed by a temperature adjusting (carbide or oxide based) ceramic heat exchanger, then, if used, a molecular filter composed of Iron Oxide catalyst to bind with Arsenic and Sulphur and residual Chlorine. To this point the process is based on Furnace products which would be (1) water condensed from the waste gas stream, (2) cast metal bars or anodes for subsequent Electrowinning in a companion electrowinning plant and (3) the captured contaminants mentioned in the molecular filter section. These are recovered when the molecular filter is regenerated (by switching to a stand by molecular filter unit), then the saturated Iron Oxide catalyst filter unit is backfilled with water and left to re-rust the Iron Oxide catalyst. This process lifts off the Arsenic, Sulphur and Chlorine liberated in the furnace and results in an aqueous solution of the contaminants, which are subsequently drained and dehydrated via microwave assisted flash distillation then via an appropriate recovery process to be returned to market. The improvement in the Flash Distillation section is based on surface irradiation of water based electrolytes with heating during the vacuum distillation.

This process section constitutes an improvement to the overall energy efficiency of the mineral recovery process to remove water with an investment of 60-80° C. waste heat and 2 kW in microwave energy/liter per minute for distilled water by pulling a partial surface heating under a partial vacuum. For terrestrial systems, the regenerate-able Molecular filter is a resource recovery point that doubles as a pollution mitigation. The net result is complete recovery of nearly all elemental resources in the process waste stream, whether it is common rock or the solids from a toxic or municipal solid waste stream process via a plasma arc furnace. The above referenced liter of water can hold about 0.684 kg of $FeCl_2$/liter. This therefore represents a 3 kW/kg of $FeCl_2$ or about a 6 kwh/kg of Iron recovered. This would be added to the electrowinning power investment to yield about 10 kW/kg/hr. as a working average for the aqueous system.

The furnace is a unique adaptation of the referenced reformer that uses the plasma arc torches, similar furnace design, Heat exchangers and Molecular filters to capture the Sulphur and arsenic in the Rusty Iron canister. There is a companion expander system as in the full reformer to recover heat to electricity and use of natural gas as a fuel source.

Flash Distillation

This process involves raising a quantity of contaminated water to as close to boiling (without actually boiling) as convenient. One example is 80° C., then applying a partial vacuum to the tank of water to be distilled. The water vapor pressure increases the closer it is to the boiling point. The rate of vapor generation is related to the water temperature and vacuum level. The lower the pressure, the faster the vapor generation, this process is suitable for high speed distillation.

Near the point where the suspended solids are precipitating the container can be pumped to another smaller and specialized container, which is constructed to permit the precipitate to be compressed and removed from the reduction system.

This part of the process eliminates water discharge from the plant and permits the solid remaining precipitate to be processed in a specific manner to recover its constituent elements.

The system can utilize an accelerated flash distillation unit that irradiates the water surface with high levels of microwave power under a partial vacuum in a closed container. This version is preferred because the water boils aggressively when heated under partial vacuum. One version uses partial vacuum to remove the heated water molecules from a bulk container leaving colder water molecules in the container holding the water based source (which in this case is the electrolyte). If the electrolyte is uniformly heated the entire mass will violently and suddenly boil effectively ejecting the entire mass into whatever manifold exists uncontrollably.

The surface heating of the electrolyte permits controlled vaporization of the electrolyte for the purpose of concentration to an anhydrous powder and the fractional distillation of the water for recycling and use in the balance of system.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A smelting system comprising:
   a source of at least one feed chemical;
   a source of ore comprising a plurality of different elements and/or comprising a plurality of different naturally occurring element compounds;
   at least one furnace for receiving the feed chemical and the ore, wherein said furnace is configured to provide heat for converting the plurality of different elements and/or the plurality of naturally occurring element compounds in the received ore into a corresponding plurality of different chemical compounds based on the feed chemical for output by the furnace; and
   a plurality of electrowinning subsystems provided in series, wherein
   said output of the furnace is fed to said plurality of electrowinning subsystems in sequence, such that each one of said electrowinning subsystems operates on a different subset of the different chemical compounds output by the furnace to extract the corresponding elements from the respective subset of chemical compounds thereby releasing the feed chemical or a compound thereof for recirculation in the smelting system, and wherein
   each one of the extracted elements is collected and output by the respective one of the electrowinning subsystems as a product of the smelting system.

2. A smelting system comprising:
   a source of a feed chemical;
   a source of ore comprising a plurality of different elements and/or comprising a plurality of different naturally occurring element compounds;
   at least one furnace for receiving the feed chemical and the ore, wherein said furnace is configured to provide heat for converting the plurality of different elements and/or the plurality of naturally occurring element compounds in the received ore into a corresponding plurality of different chemical compounds based on the feed chemical for output by the furnace; and
   a plurality of electrowinning subsystems, wherein
   said output of the furnace is fed to each one of said plurality of electrowinning subsystems, such that each one of said electrowinning subsystems operates on a different one of the different chemical compounds output by the furnace to extract the corresponding element from the respective chemical compound thereby releasing the feed chemical or a compound thereof for recirculation in the smelting system, and wherein each one of the extracted elements is collected and output as a product of the smelting system.

3. The smelting system of claim 2, wherein said at least one furnace is a furnace configured to receive the ore comprising a plurality of the elements and the feed chemical comprising chlorine for outputting the plurality of different chemical compounds that are chloride salts of the various elements to the electrowinning subsystem.

4. The smelting system of claim 2, wherein said at least one furnace is comprised of a first furnace configured to receive the ore comprising a plurality of the element oxides and receiving one of the at least one feed chemicals including hydrogen for stripping a substantial portion of the oxygen from the oxides for outputting a plurality of different elements; and wherein said at least one furnace is also comprised of a second furnace for receiving the plurality of different elements and receiving one of the at least one feed chemicals including chlorine for outputting the plurality of different chemical compounds that are chloride salts of the various elements to the electrowinning subsystems.

5. The smelting system of claim 4, wherein the feed chemical including hydrogen includes water.

6. A smelting system comprising:
a source of a feed chemical including chlorine;
a plurality of different intermixed elements obtained from an ore;
at least one furnace for receiving the feed chemical and the plurality of intermixed elements obtained from the ore, wherein said furnace is configured to provide heat for converting the plurality of different elements into a corresponding plurality of different elemental chlorine salts using the feed chemical for output by the furnace; and
a plurality of electrowinning subsystems provided in series, wherein
said output of the furnace is fed to said plurality of electrowinning subsystems in sequence, such that each one of said electrowinning subsystems operates on a different one of the element salts output by the furnace to extract the corresponding element from the respective element salt thereby releasing the feed chemical or a compound thereof for recirculation in the smelting system, and wherein
each one of the extracted elements is collected and output by the respective one of the electrowinning subsystems as a product of the smelting system.

7. The smelting system of claim 6, wherein the feed chemical including chlorine is provided by a chlorinating subsystem, which recirculates the chlorine from the electrowinning subsystem.

8. The smelting system of claim 7, wherein said chlorinating subsystem includes a chloralkyli chloride generator.

9. The smelting system of claim 8, wherein said chlorinating subsystem includes a water condensation section.

10. A smelting system comprising:
a source of a feed chemical including chlorine;
a plurality of different intermixed elements obtained from an ore;
at least one furnace for receiving the feed chemical and the plurality of intermixed elements obtained from the ore, wherein said furnace is configured to provide heat for converting the plurality of different elements into a corresponding plurality of different elemental chlorine salts using the feed chemical for output by the furnace;
a plurality of electrowinning subsystems provided in series for receiving the output of the furnace in sequence;
a chlorinating subsystem including a chloralkyli chloride generator, said chlorinating subsystem configured to recirculate the chlorine from the electrowinning subsystem for reuse in the feed chemical;
a flash distillation subsystem for adjusting the pH of the electrowinning subsystem using hydrochloric acid;
a water sparging subsystem configured to cool and condense at least a portion of volatized metal chlorides and chlorine output by said at least one furnace for capture and recirculation; and
at least one energy capture subsystem configured to operate using a transcritical or supercritical $CO_2$ Rankin cycle for capturing waste energy output by the smelting system for converting to electricity, wherein
said output of the furnace is fed to said plurality of electrowinning subsystems in sequence, such that each one of said electrowinning subsystems operates on a different one of the element salts output by the furnace to extract the corresponding element from the respective element salt thereby releasing the feed chemical or a compound thereof for recirculation in the smelting system, and wherein
each one of the extracted elements is collected and output by the smelting system.

11. A method of extracting elements from an ore, comprising the steps of:
pulverizing ore containing a plurality of intermixed elements and/or element oxides;
if present, converting at least some of the element oxides in the ore into the underlying elements by stripping oxygen from the element oxides using hydrogen and heat;
heating the elements with a source chemical including chlorine to convert the elements into element chloride salts;
electrowinning the element chloride salts in a manner to remove the chlorine and separate each one of the plurality of the elements from each other for collecting the separated elements into recoverable quantities;
recovering the source chemical for reuse in this method; and
removing the recovered quantities of elements for output.

12. A method of extracting elements from an ore, comprising the steps of:
pulverizing ore containing a plurality of intermixed elements, alloys, and/or element compounds;
if present, converting at least some of the element compounds in the ore into the underlying elements using heat;
heating the elements with a source chemical to convert at least some of the elements into element compounds;
outputting the heated elements and/or element compounds for input into an electrowinning sub system;
electrowinning the elements and/or element compounds using the electrowinning subsystem in a manner to remove the source chemical and separate each one of the plurality of the elements from each other for collecting the separated elements into recoverable quantities;

recovering the source chemical for reuse in this method; and removing the recovered quantities of elements for output.

13. The method of claim 11, wherein said electrowinning uses an anhydrous pyrophoric chloride conversion process utilizing heat.

* * * * *